(12) United States Patent
Sambe

(10) Patent No.: US 8,368,908 B2
(45) Date of Patent: Feb. 5, 2013

(54) RESTRICTION OF PRINT JOB EXECUTION

(75) Inventor: Hideo Sambe, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 12/698,364

(22) Filed: Feb. 2, 2010

(65) Prior Publication Data
US 2010/0214587 A1   Aug. 26, 2010

(30) Foreign Application Priority Data

Feb. 26, 2009   (JP) ................................ 2009-044731

(51) Int. Cl.
*G06F 15/00* (2006.01)
*G06F 3/12* (2006.01)
*G06K 1/00* (2006.01)
*G06K 15/00* (2006.01)

(52) U.S. Cl. ...................................... 358/1.13; 358/1.14
(58) Field of Classification Search ........................ None
See application file for complete search history.

(56) References Cited

FOREIGN PATENT DOCUMENTS
JP   2007-128202   5/2007

*Primary Examiner* — Douglas Tran
(74) *Attorney, Agent, or Firm* — Fitzpatrick, Cella, Harper & Scinto

(57) ABSTRACT

The following processes are executed in order to restrict an execution of a job based on job data formed by using a driver other than a specified device driver. The device driver which formed the received job data is specified. Whether or not use of the device driver is permitted is discriminated. If it is decided that the use of the device driver is not permitted, the execution of the job based on the received job data is restricted.

7 Claims, 5 Drawing Sheets

| [ITEM] | [VALUE] | [NOTICE] |
|---|---|---|
| IP ADDRESS OF PC | 192.168.10.xx , 192.168.11.xx | NO |
| MAIL ADDRESS OF DESTINATION | xx@abcde.co.jp , yy@abcde.co.jp | |
| USER NAME | ANY | NO |
| VALID VERSION OF PRINTER DRIVER | V2.00 | YES |

| [ITEM] | DATE | IP ADDRESS | USER NAME | VERSION OF PRINTER DRIVER |
|---|---|---|---|---|
| HISTORY 1 | 2008/08/10 10:00 | 192.168.20.30 | TARO | V2.00 |
| HISTORY 2 | 2008/08/10 15:00 | 192.168.10.10 | HANAKO | V1.20 |
| | | | | |

| [ITEM] | IP ADDRESS | USER NAME | VERSION OF PRINTER DRIVER | NOTICE |
|---|---|---|---|---|
| INHIBIT 1 | 192.168.20.30 | | | YES |
| INHIBIT 2 | | | V1.20 | YES |

FIG. 6

```
<PRINT JOB>

[SENDER INFO]
        IP ADDRESS

[JOB INFO]
        USER NAME
        VERSION OF PRINTER DRIVER
        JOB NAME

PRINT DATA
```

RESTRICTION OF PRINT JOB EXECUTION

BACKGROUND OF THE INVENTION

1. Field of the Invention

The present invention relates to job processing apparatus and method for processing a received job.

2. Description of the Related Art

In the related art, when a job is processed by a job processing apparatus such as a printer, a client terminal which requests execution of the job forms job data by using a device driver (printer driver). The printer receives the job data, analyzes the data, and executes the job (printing).

In this case, since the printer side cannot know by which printer driver the job data has been formed, there is a case where an image cannot be correctly reproduced depending on the printer driver used on the client side. Depending on the used printer driver, there is also a case where a function which is considered to be necessary for the administrator such as a function for managing the user who instructed the execution of the job.

However, in the related art, the user executes the job without recognizing by which driver the job data has been formed.

Such an apparatus which monitors an unauthorized access to the printer and which, when there is an unauthorized access, notifies it has been known (refer to Japanese Patent Application Laid-Open No. 2007-128202). However, even if the received job data was formed by which kind of driver, the printer also executes the job.

SUMMARY OF THE INVENTION

It is an aspect of the invention to provide job processing apparatus and method which can solve the foregoing problems.

Another aspect of the invention is to restrict execution of a job based on job data formed by using a driver other than a specific device driver.

The above-mentioned aspects and the other aspects of the present invention will become apparent from the following description of exemplary embodiments with reference to the attached drawings.

BRIEF DESCRIPTION OF THE DRAWINGS

FIG. 3 is a diagram illustrating an example of a construction of a printer registration information table T1.

FIG. 4 is a diagram illustrating a construction of an unrecommended access history table T2.

FIG. 5 is a diagram illustrating a construction of a print inhibit setting information table T3.

FIG. 6 is a diagram illustrating a construction of a file of a print job transmitted from the user in the embodiment 1.

DESCRIPTION OF THE EMBODIMENTS

An embodiment of the invention will be described in detail hereinbelow with reference to the drawings. A construction illustrated in the following embodiment is nothing but an example and the invention is not limited to the illustrated construction.

Figure 1:
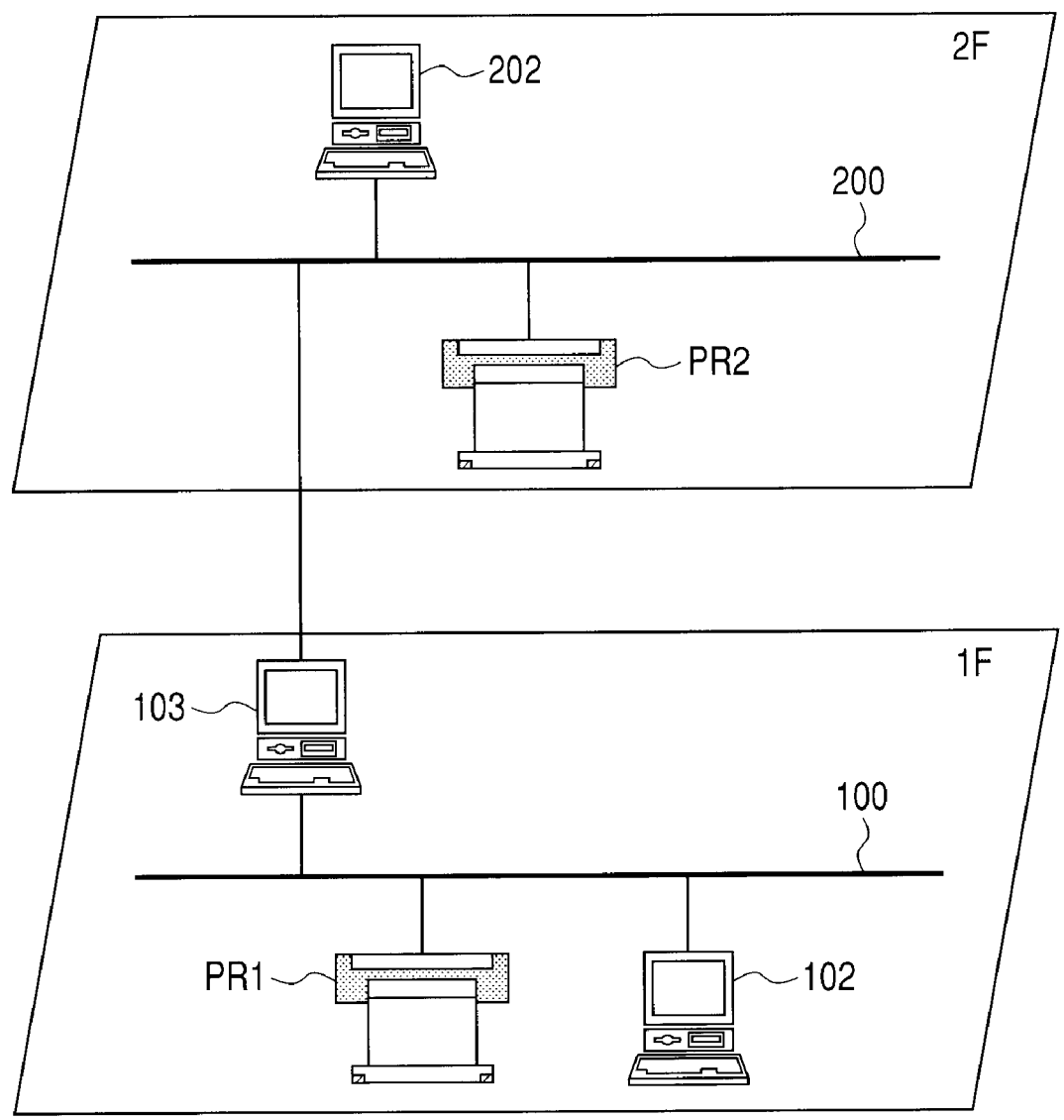
FIG. 1 is a system diagram including printer apparatuses PR1 and PR2 according to an embodiment 1.

FIG. 1 is a diagram illustrating a construction of a network system including printer apparatuses PR1 and PR2 according to the embodiment of a job processing apparatus of the invention. The system can transmit and receive data between the apparatuses according to a TCP/IP.

In the example, it is assumed that the printer apparatus PR1, a client PC 102, and a PC 103 having a routing function based on an IP address are provided on the first floor of a building and they are operating on a same subnet through a network 100.

It is assumed that the printer apparatus PR2 and a client PC 202 are provided on the second floor of the building and they are operating through a network 200 of a subnet different from the network 100.

A different IP address is allocated to each apparatus on the networks 100 and 200. When the printer apparatuses PR1 and PR2 receive print data (job data) from another apparatus such as a client PC 102 and print it, they confirm various kinds of information such as a sender IP address and the like and decide permission or inhibition of the printing. With respect to an access which a printer administrator does not desire, the printer apparatuses PR1 and PR2 also have a function for blocking the access (refusing execution of the printing) based on a past access history as will be described hereinafter.

The client PCs 102 and 202 can be realized by general personal computers. It is assumed that an OS, and a printer driver, application software, and the like which operate on the OS have been installed in the client PCs 102 and 202. When the user of the client PC forms data to be printed by using the application software and selects the printer apparatus PR1 or PR2 from a print menu of the application software, the printer driver for one of the printer apparatuses is activated. When the user instructs the printing from the printer driver, the printer driver converts the data formed by the application software into a format of the print data. The print data is transmitted as job data to the selected printer apparatus. The job data which is formed by the printer driver is one of data obtained by developing the data received from the application software into image data and data obtained by replacing it by a predetermined draw command. When the job data is transmitted, the IP address allocated to the client PC, a name of the PC, a name of the user who instructed the formation of the job data, information which can specify the printer driver which formed the job data, and the like are also transmitted from the client PC. It is assumed that the printer driver of a specific version or higher can form an image of high image quality (execute an advanced image process, or the like). The printer driver of the specific version or higher has a function for executing a charging process according to the contents of a print job by the user in response to an instruction of the print job.

Figure 2:
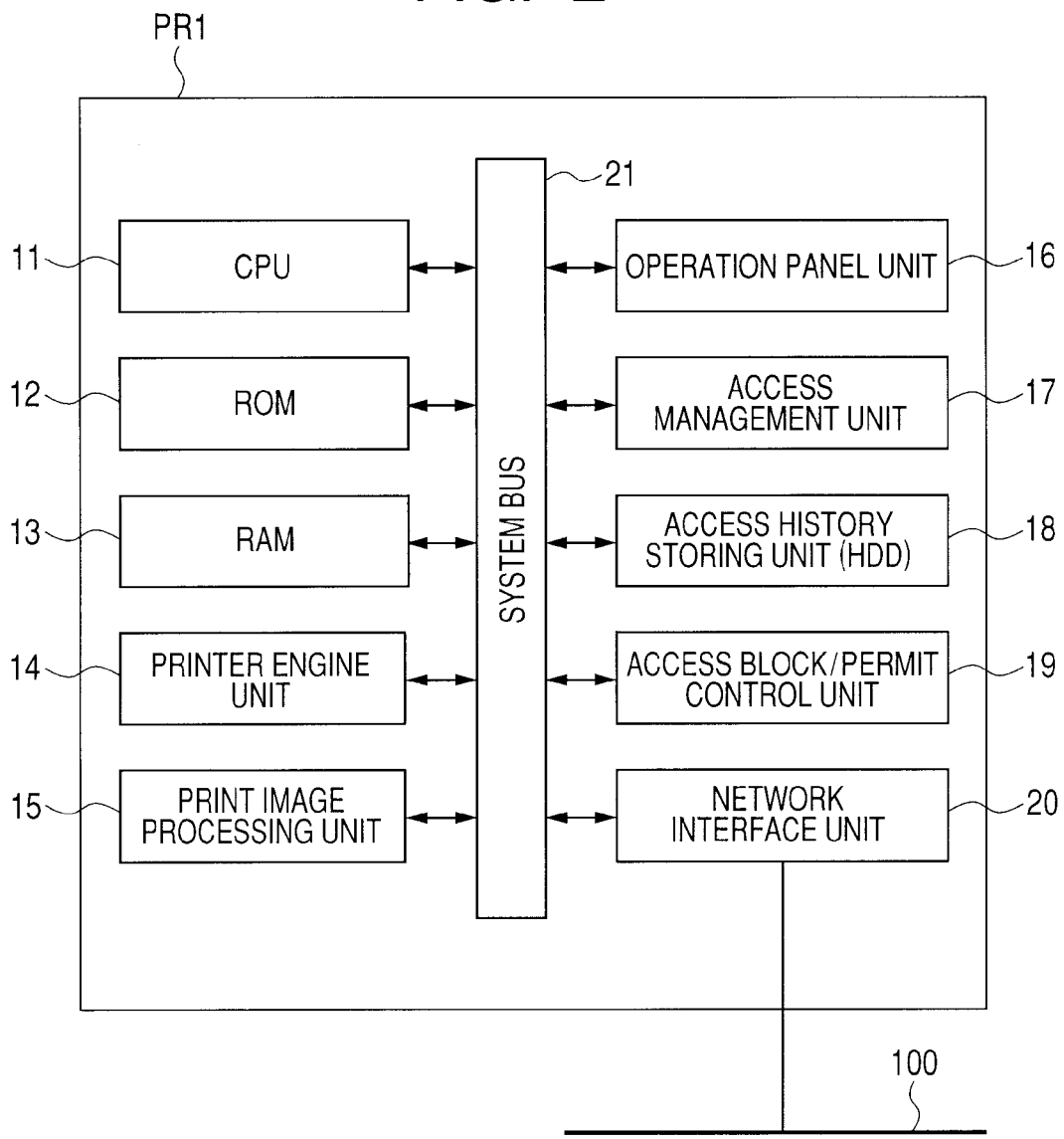
FIG. 2 is a block diagram illustrating an internal construction of the printer apparatus PR1.

FIG. 2 is a block diagram illustrating an internal construction of the printer apparatus PR1. The printer apparatus PR2 also has a similar construction.

Each of the printer apparatuses PR1 and PR2 has a CPU 11, a ROM 12, a RAM 13, a printer engine unit 14, a print image processing unit 15, an operation panel unit 16, and an access management unit 17. Each of the printer apparatuses PR1 and PR2 also has an access history storing unit 18, an access block/permit control unit 19, a system bus 21, and a network interface unit 20. The CPU 11 executes control software (program) stored in the ROM 12 and integratedly controls each module connected to the system bus 21. The RAM 13 is used as a main memory, another work area, or the like of the CPU 11.

The printer engine unit 14 integratedly controls various kinds of control regarding the printing process, through the system bus 21. The print image processing unit 15 forms a print image from the received job data. The printer engine unit 14 prints an image onto a print sheet based on the print image. If the print data is not formed by the printer driver of a predetermined version or higher, the printer engine unit 14 cannot print the image of the picture quality of a predetermined level or higher. The operation panel unit 16 has: a liquid crystal display screen for displaying a state of the printer apparatus and the like; and a plurality of keys adapted to execute a user input and the like.

The access management unit 17 monitors reception information regarding the print job process and stores it into the access history storing unit 18 provided in a built-in hard disk of a hard disk drive (HDD) which the printer apparatus itself possesses. "Information regarding the print job process" mentioned here denotes the IP address of the client PC, the user name, the printer driver version, a print protocol, a print language, and the like. Those information is included in the received job data or it is received together with the job data. The access history storing unit 18 stores a registration information table which is set by the printer administrator.

Based on the reception information stored in the access history storing unit 18, the access block/permit control unit 19 blocks or permits the access to the printer apparatuses PR1 and PR2 according to conditions (registration information table) set by the printer administrator or the like.

The network interface unit 20 controls communication which is made with an apparatus such as a client PC on the network through the network 100 (or network 200). The network interface unit 20 can decide the "IP address" of the sender PC from the received job data or from the data received together with the job data. The network interface unit 20 also can decide the "user name" of the user who transmitted the job, the "PC name" of the sender PC, and the like from header information of the job. There is an LPR or the like as a protocol which is used when the job data (print data) is received. The network interface unit 20 also has a function for transmitting E-mail.

FIG. 3 is a diagram illustrating an example of registration information table T1 which is registered into the access history storing unit 18 of each of the printer apparatuses PR1 and PR2. The registration information table T1 is registered by a file transfer from the PC 102 or the like or by the operation of the user through the operation panel unit 16.

As setting items on the table, there are: an IP address of the PC which permits use of the printer apparatus; a mail address of a destination which is notified of a fact that there was an access to the printer apparatus; a user name of a job sender who permits the printing; and a version of the printer driver which permits the printing.

Values "192.168.10.xx" and "192.168.11.xx" have been set into the item "IP address". "xx" is set into a value within a range of 1 to 255. In the case of the access from the PC having any one of those IP addresses, the printing is permitted.

In the case where the access block/permit control unit 19 blocked the access to the printer apparatus or received job data whose access is not permitted, an address of the destination which is notified of such a fact is described in the item "mail address of destination". Values "xx@abcde.co.jp" and "yy@abcde.co.jp" have been set there. A communicating method in this instance is not limited to the transmission by E-mail but may be, for example, event communication to an application on the PC by a designation of the IP address.

With respect to the user name which is attached to the job data, the name of the user who permits the access to the printer apparatus is described in the item "user name". A value "ANY" denotes all users. If the specific user name has been described in this value, the printer apparatus does not execute the printing of data other than the job data from the user name.

The version in which the execution of the printing is permitted with respect to the version of the printer driver which formed the received job data is described in the item "version of printer driver". "Version 2.00" has been designated here. That is, when the job data is transmitted to the printer apparatus, the client PC transmits version information of the printer driver which formed the job data. The printer apparatus confirms the version information and decides the permission or inhibition of the printing. The version is not limited only to a specific version but may be designated as a specific version or higher. The version is not limited to the designation of only the version information but may be set to information which specifies the printer driver in various formats such as name of the printer driver, name of the printer driver and its version, and the like.

Although not shown here, a "communication protocol" such as LPR or FTP at the time of reception of the job data, a "printer language" such as PS (Post Script) or LIPS of the job data can be also set as a registration item which is used to discriminate the permission or inhibition of the access to the printer apparatus. Further, the item may be formed by one of AND and OR of those items.

As for "notice", in the case where the job data corresponding to the data in which the access is not permitted about the relevant item was received, whether or not a notification to the mail address of the destination is made is designated.

If the job data which does not correspond to the contents registered in the table T1 of FIG. 3 was received, there is no need to unconditionally inhibit the printing. As will be described hereinafter, the job data may temporarily be stored as an access history and may be inhibited after that (unless otherwise the administrator rewrites the table so as to permit the access).

FIG. 4 is a diagram illustrating an example of an access history table T2 which is registered into the access history storing unit 18 of each of the printer apparatuses PR1 and PR2.

Each time the printer administrator receives the job data which is not permitted, its history information is sequentially registered. The job data which is not permitted denotes such data as in a case where, when the job data is received, the obtained information and the item described in the registration information table T1 are compared and they do not coincide (it is included in a range where the job data is not permitted). In this instance, the value which is not permitted and the value included in the range where the job data is not permitted are registered so that they can be distinguished.

In this instance, besides a date when the job data has been received, in a history 1, since the IP address of the sender of the job data is not involved in the IP address registered in the table T1, the history information has been registered in the access history table T2 as an access out of designation. In a history 2, since the version of the printer driver which formed the received job data differs from the version registered in the table T1, the history information has been registered in the access history table T2 as an access out of designation. The access history storing unit 18 executes the registering process here.

FIG. 5 is a diagram illustrating a construction of a print inhibit setting information table T3 which is registered into the access history storing unit 18 of each of the printer apparatuses PR1 and PR2. Opposite to the table T1, in the table T3, the execution (printing process) of the job data which coincides with the information registered here is inhibited. In this instance, since the job data which does not correspond to the contents registered in the table T1 was received, the history information is registered in the access history table T2 and the job data corresponding to them is inhibited from the next time.

The example of FIG. 5 indicates the registration adapted to inhibit all of the printing from the IP address "192.168.20.30", based on the history 1, and the printing of the printer driver version "V1.20" in the history 2, as recorded in the access history table T2. When the information is registered in the table T3, the printing by the printer apparatus regarding the job data corresponding to the registered contents is inhibited and its fact is notified. The administrator can also properly correct the contents in the table T3 through the client PC or the operation panel unit 16.

FIG. 6 is a diagram illustrating an example of the information included in the job data (print job) transmitted from the client PC. As illustrated in FIG. 6, the IP address for specifying the sender (PC, another apparatus) is included as sender information in the job data. The user name for specifying the user which instructed the formation of the job data, the printer driver version for specifying the printer driver which formed the job data, and the job name for specifying the job are included as job information. The print data (image data, draw command, and the like) which the printer apparatus prints is included. Although it is assumed in the above example that the sender information and the job information are included in the job data, the sender information and the job information may be separated from the print data.

Figure 7:
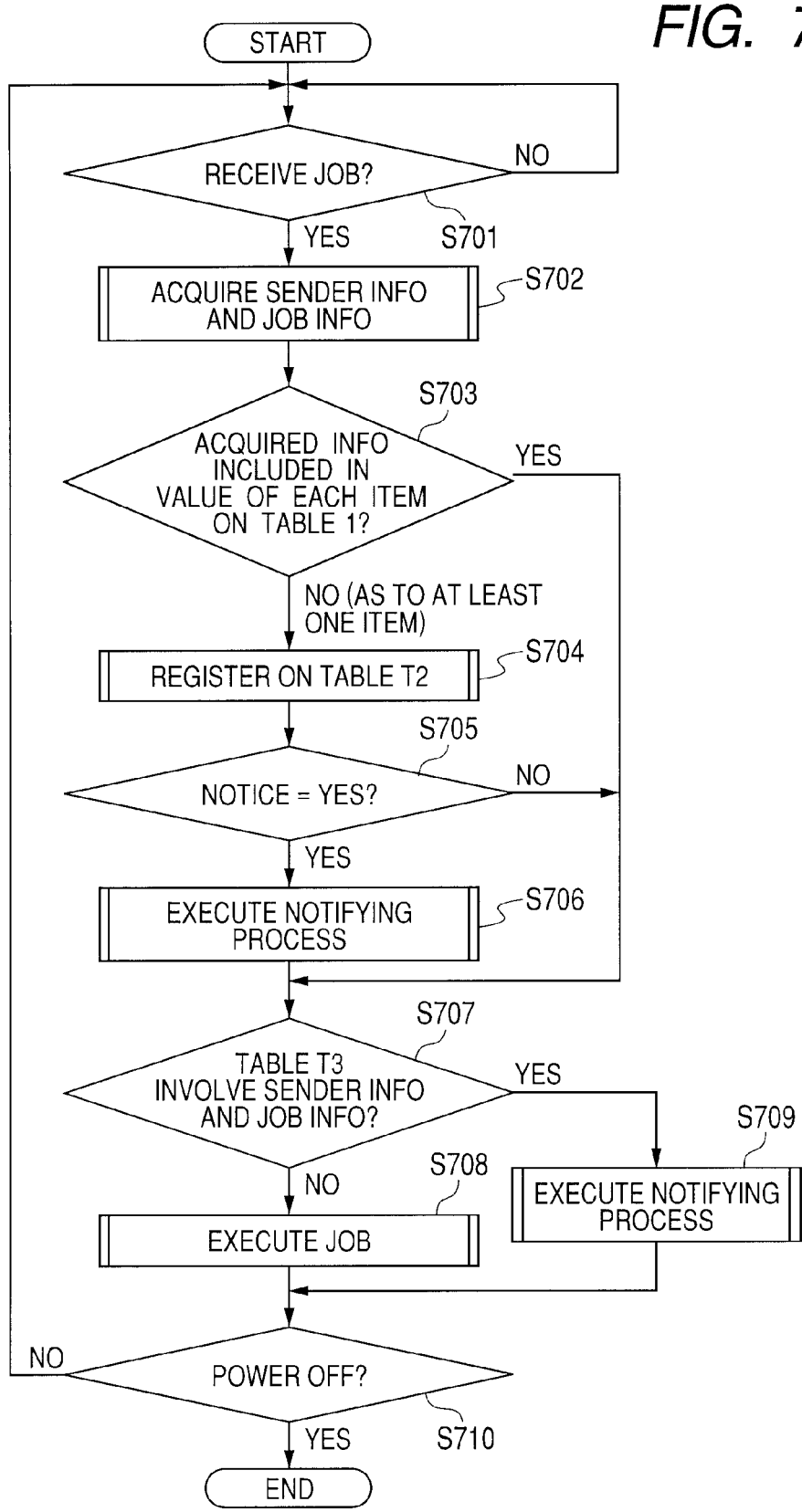
FIG. 7 is a flowchart for storage of an access history and the like of the printer apparatus PR1.

FIG. 7 is a flowchart illustrating a flow for processes of the job data in the printer apparatuses PR1 and PR2. The flowchart shows the flow for the processes which are executed when the CPU 11 loads the program stored in the ROM 12 into the RAM 13 and executes the program.

In S701, the apparatus waits for the job data from the client PC through the network interface unit 20. When the job data is received, the sender information, the job information, and the like of the received job data are acquired in S702. The IP address of the sender apparatus, the user name of the job, the information for specifying the printer driver which formed the job data, the protocol at the time of the reception of the job data, the print language of the job data, and the like are included in the information which is acquired. It is unnecessary to acquire all of those information but a part of them may be acquired.

Subsequently, in S703, the information acquired in S702 and each value in the table T1 of FIG. 3 are compared and whether the values of all of the items involved in the table T1 in the acquired information coincide with the values in which the execution of the job is permitted or they are included in the range where the job execution is permitted is discriminated. That is, in S703, whether or not the execution of the job based on the received job data should be restricted (based on the setting made by the administrator) is discriminated. If it is determined here that all of the items are involved, the processing routine advances to S707. If at least one item is not included, the processing routine advances to S704.

If at least one item is included in the values or range where the job execution is not permitted as a result of the comparison in S703, the information of the relevant job data is registered as a history into the table T2 in S704. At this time, the value which does not coincide with the value of any one of the items in the table T1 and the value out of the range are registered so that they can be distinguished. In this instance, the registration into the table T3 based on the value which does not coincide with each value in the table T1 or the value out of the range is not executed yet. Therefore, in this instance, if the apparatus is not set so as to inhibit the job execution based on the table T1, the job is executed in a step (S708) of a job executing process, which will be described hereinafter.

Whether or not the apparatus has been set in the table T1 so as to notify the user with respect to the job which was determined in S703 so that the execution of the job should be restricted is discriminated in S705. If the apparatus has been set so as to notify the user, the processing routine advances to S706 and the E-mail is transmitted to the mail address registered in the table T1. In this instance, information showing that the job data in which the job execution is not permitted in the table T1 has been received, information regarding the job data (the obtained sender information and job information), and the like are described in text of the E-mail or the like. For example, if the version of the printer driver is out of the range where the execution of the job is permitted, a message adapted to promote the version-up of the printer driver or a URL showing a path to a setup file of the printer driver of the new version may be described. In place of the notification by the E-mail, utility software for the PC may be notified by using the IP address or the like.

Whether or not the information acquired in S702 is involved in the table T3 is discriminated in S707. If it is decided that the information is not involved, the processing routine advances to S708. If it is decided that the information is involved, the processing routine advances to S709.

In the case where the apparatus has been set so as to notify by the table T3 without executing the job based on the received job data, a message showing that the inhibition of the execution of the job, the information acquired in S702, and a message showing a reason for the inhibition, an eliminating method of the inhibiting state, and the like are notified to the mail address registered in the table T1, in S709. As mentioned above, such a notification may be made by a method other than the E-mail. In the case where the apparatus has been set so as not to notify by the table T3, the notification here is omitted. In place of the notification by the communication, such information may be printed onto a sheet by the printer engine unit 14.

If the information acquired in S702 is not registered onto the table T3, a print job based on the received job data is executed in S708. The case where the information is not registered in the table T3 corresponds to a case where the information (sender information) acquired in S702 according to the job data received in S701 is the first information, a case where the information which should be inhibited has been deleted from the table T3 by the administrator, or the like. If the information acquired in S702 is determined so that the execution of the job should be restricted in S703 with respect to the job executed in S708, the information is registered onto the table T3. "First" denotes a case where the sender information is not stored in the table T2.

The reason why the execution of the job is permitted from the first sender is to enable the administrator to discriminate whether or not the job execution should be permitted from the same sender from now on based on a printed result. Naturally, even at the first time, the job execution may be inhibited. In such a case, it is sufficient that the process of S708 is not executed with respect to the job of which the execution based on the received job data should be restricted as a result of the discrimination in S703.

If it is determined in S710 that a power source is not turned off, the processing routine is returned to S701 and the apparatus waits for the reception of the next job data. If it is determined in S710 that the power source has been turned off, the process is finished.

According to the embodiment as mentioned above, with respect to the received job data, the execution of a job other than the job which should be permitted can be restricted based on various kinds of information received together with the job data. The contents of the restriction can be properly changed according to the registration by the administrator or the like.

The information which is referred to when restricting the job execution is not limited to that mentioned above. For example, it is also possible to construct in such a manner that by which route the job data has reached the printer apparatus is discriminated, such as a router through which the job data has been transmitted is specified, and the job execution is restricted based on a result of the discrimination.

Although the embodiment has been described above with respect to the printer apparatus as an example of the job processing apparatus, the invention is not limited to it. In a facsimile apparatus which transmits facsimile data formed by a facsimile driver on the client PC, the execution of a facsimile job out of designation may be restricted. In a scanner apparatus which receives a reading request from a scanner driver on the client PC and executes the reading of an original document, the execution of a scanning job based on a reading request out of designation may be restricted. "Out of designation" denotes a case which does not conform with the conditions which are permitted in the table T1.

Although the foregoing example relates to the case where the conditions adapted to permit (or restrict) the execution of the job are arbitrarily registered onto the table T1 by the administrator, the invention is not limited to such a case.

For example, the invention may be applied to a job processing apparatus which executes a process, as a default function, for restricting the execution of the job so long as it is not the job data formed by a specific device driver in order to guarantee picture quality, use a specific function (charging function), or the like. In this case, if the job processing apparatus is a printer apparatus and the device driver is a printer driver, it is sufficient to substitute the processing steps in the flowchart of FIG. 7 as follows.

S702: "Acquire information to specify printer driver which formed received job data" (The information to specify the printer driver may be either a type or a version of the printer driver or may be both of them.)

S703: "Printer driver which formed received job data is permitted?" (If YES, S707 follows. If NO, S708 follows.)

S707: "Use of printer driver which formed received job data is inhibited?" (If YES, S709 follows. If NO, S708 follows.)

According to the foregoing processes, in the case where the specific printer driver or the printer driver of the specific version or higher is not used, the processes of the received job data can be restricted.

Although the case where the restriction of the printer driver is set to a default has been described here, the restriction based on other information may be set to a default.

The invention is also realized by executing the following processes: that is, processes in which software (program) for realizing the functions of the embodiments mentioned above is supplied to a system or an apparatus through a network or various kinds of storage media and a computer (or a CPU, an MPU, or the like) of the system or apparatus reads out and executes the program. The program which is executed by the printer apparatus may be executed by one CPU or may be executed by a plurality of CPUs in an interlocking relational manner. The processes may be executed by properly combining software and hardware. The program may be executed by a CPU of an apparatus provided outside the printer apparatus in place of the CPU in the printer apparatus.

The invention is not limited to the foregoing embodiments but various modifications (including a combination of a plurality of embodiments) are possible based on a spirit of the invention and they are not excluded from the scope of the invention.

Although the various examples and embodiments of the invention have been described above, the spirit and scope of the invention is not limited by the specific description of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-044731, filed on Feb. 26, 2009, which is hereby incorporated by reference herein in its entirety.

What is claimed is:

1. A job processing apparatus for executing a job based on job data formed by a device driver, comprising:
    a receiving unit configured to receive job data and information for specifying a device driver which formed the received job data;
    a specifying unit configured to specify the device driver which formed the job data received by the receiving unit based on the information received by the receiving unit;
    a discriminating unit configured to discriminate whether or not use of the device driver specified by the specifying unit is permitted; and
    a control unit configured to restrict an execution of a job based on the job data received by the receiving unit in the case where the discriminating unit discriminates that the use of the device driver specified by the specifying unit is not permitted.

2. An apparatus according to claim 1, further comprising a print processing unit configured to execute a printing process based on the job data received by the receiving unit, and wherein the control unit restricts an execution of the printing process by the print processing unit.

3. An apparatus according to claim 1, wherein the specifying unit specifies a type or version of the device driver.

4. An apparatus according to claim 1, further comprising an identifying unit configured to identify a sender of the job data received by the receiving unit, and wherein the control unit restricts the execution of the job based on the job data received by the receiving unit according to the sender identified by the identifying unit.

5. An apparatus according to claim 4, wherein even in the case where the discriminating unit discriminates that the use of the device driver specified by the specifying unit is not permitted, if the job data received by the receiving unit is data which has been received for the first time from the sender identified by the identifying unit, the control unit permits the execution of the job based on the job date.

6. A job processing method comprising:
    receiving job data and information for specifying a device driver which formed the received job data;
    specifying the device driver which formed the received job data based on the received information;
    discriminating whether or not use of the specified device driver is permitted; and
    restricting an execution of a job based on the received job data in the case where it discriminated that the use of the specified device driver is not permitted.

7. A non-transitory computer-readable storage medium which stores a program that can be executed by a computer, wherein the program executes processes for:
   receiving job data and information for specifying a device driver which formed the received job data;
   specifying the device driver which formed the received job data based on the received information;
   discriminating whether or not use of the specified device driver is permitted; and
   restricting an execution of a job based on the received job data in the case where it is discriminated that the use of the specified device driver is not permitted.

* * * * *